(12) United States Patent
Biadatz et al.

(10) Patent No.: US 9,376,126 B2
(45) Date of Patent: Jun. 28, 2016

(54) HOLDING ARRANGEMENT FOR AN ENTRY AREA OF A RAIL VEHICLE AND METHOD FOR ASSEMBLING THE HOLDING ARRANGEMENT

(71) Applicant: SIEMENS AKTIENGESELLSCHAFT, Munich (DE)

(72) Inventors: Adrian Biadatz, Krefeld (DE); Sascha Kirchhoff, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 14/403,254

(22) PCT Filed: Apr. 4, 2013

(86) PCT No.: PCT/EP2013/057084
§ 371 (c)(1),
(2) Date: Nov. 24, 2014

(87) PCT Pub. No.: WO2013/178387
PCT Pub. Date: Dec. 5, 2013

(65) Prior Publication Data
US 2015/0090153 A1 Apr. 2, 2015

(30) Foreign Application Priority Data
May 29, 2012 (DE) .......................... 10 2012 208 991

(51) Int. Cl.
*B61D 37/00* (2006.01)
*B61D 17/18* (2006.01)
(Continued)

(52) U.S. Cl.
CPC *B61D 37/00* (2013.01); *B60N 2/24* (2013.01); *B60N 3/026* (2013.01); *B61D 17/18* (2013.01); *B61D 19/00* (2013.01); *B61D 49/00* (2013.01)

(58) Field of Classification Search
CPC ........ B61D 37/00; B61D 17/18; B61D 19/00; B61D 49/00; B60N 2/24; B60N 3/026
See application file for complete search history.

(56) References Cited

U.S. PATENT DOCUMENTS 2,037,805 A * 4/1936 Lindstedt ............... B61D 23/02
105/447
2,672,103 A * 3/1954 Hohmes ................... B60N 3/02
105/354

(Continued)

FOREIGN PATENT DOCUMENTS

DE 508577 C 9/1930
WO 2005102773 A1 11/2005

OTHER PUBLICATIONS

Karl-Heinz Garre, "20 Years of InterCityExpress—a success story", pp. 212-223; ZEVrail 135 Rolling Stock, 2011, DE, Jun. 6, 2011—English abstract.

*Primary Examiner* — Jason C Smith
(74) *Attorney, Agent, or Firm* — Laurence Greenberg; Werner Stemer; Ralph Locher

(57) ABSTRACT

A mounting arrangement for an entry area of a rail vehicle includes a rod-shaped holding element that has a passage opening; a doorpost paneling element for covering a doorpost, wherein the doorpost paneling element has a passage opening; a spacer element that is arranged between the holding element and the doorpost paneling element and has a passage opening; a connecting element for connecting the doorpost paneling element to the doorpost, wherein the connecting element is arranged on a side of the doorpost paneling element facing away from the spacer element and has a passage opening; and a connecting screw, which is screwed through the passage opening of the holding element, the passage opening of the spacer element and the passage opening of the doorpost paneling element in the passage opening of the connecting element.

13 Claims, 6 Drawing Sheets

(51) Int. Cl.
*B61D 19/00* (2006.01)
*B61D 49/00* (2006.01)
*B60N 3/02* (2006.01)
*B60N 2/24* (2006.01)

(56) References Cited

U.S. PATENT DOCUMENTS

| | | | | |
|---|---|---|---|---|
| 3,159,089 A * | 12/1964 | Eggert, Jr. | ............... | B61D 17/12 454/99 |
| 3,210,875 A * | 10/1965 | Schwenkler | ........... | B60Q 3/025 362/479 |
| 3,577,903 A * | 5/1971 | Eggert, Jr. | ........... | B60H 1/00371 296/208 |
| 3,838,747 A * | 10/1974 | Letzel | ...................... | B60N 3/02 180/90 |
| 4,072,339 A * | 2/1978 | Rothlisberger | .......... | B60N 3/02 105/354 |
| 4,626,016 A * | 12/1986 | Bergsten | ................. | B60N 3/02 105/354 |
| 4,912,808 A * | 4/1990 | Blakely | ................. | B60N 3/026 16/422 |
| 5,441,326 A * | 8/1995 | Mikalonis | .......... | B60H 1/00371 105/325 |
| 5,519,917 A * | 5/1996 | Cordonnier | ............ | B60N 3/026 16/422 |
| 6,131,979 A * | 10/2000 | McGhee | ................ | B61D 37/00 296/1.02 |
| 7,445,188 B2 * | 11/2008 | Lamparter | ............. | B60R 5/003 108/149 |
| 7,744,141 B2 * | 6/2010 | Saionji | ................... | B60N 3/023 16/429 |
| 7,934,294 B1 * | 5/2011 | Janes | ....................... | B25G 3/12 16/110.1 |
| 2009/0127834 A1 * | 5/2009 | Hemingway | .......... | B60N 3/026 280/728.2 |
| 2009/0295180 A1 * | 12/2009 | Boehner | ................ | B60N 3/023 296/1.02 |
| 2013/0133158 A1 * | 5/2013 | Tran | ...................... | A47B 95/02 16/422 |
| 2014/0312600 A1 * | 10/2014 | Verner | .................. | B60R 13/025 280/728.2 |
| 2014/0312643 A1 * | 10/2014 | Chikada | ................ | B60N 3/026 296/71 |
| 2015/0090153 A1 * | 4/2015 | Biadatz | .................. | B61D 17/18 105/457 |
| 2015/0143673 A1 * | 5/2015 | Biadatz | ................ | B61D 17/043 24/458 |
| 2015/0224903 A1 * | 8/2015 | McDowell | ............ | B60N 3/023 297/183.6 |

* cited by examiner

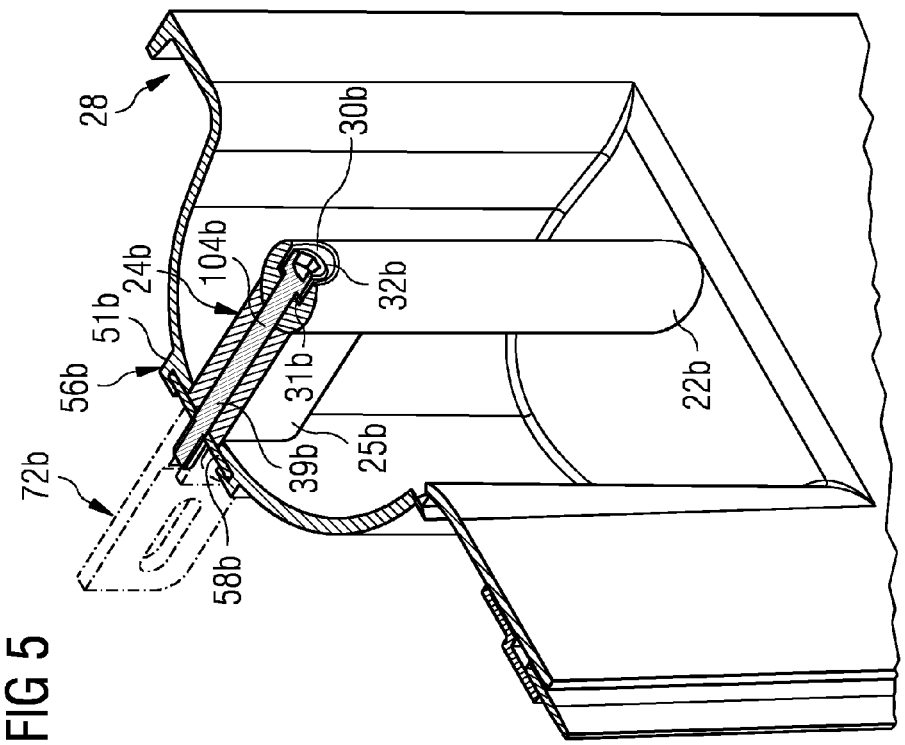
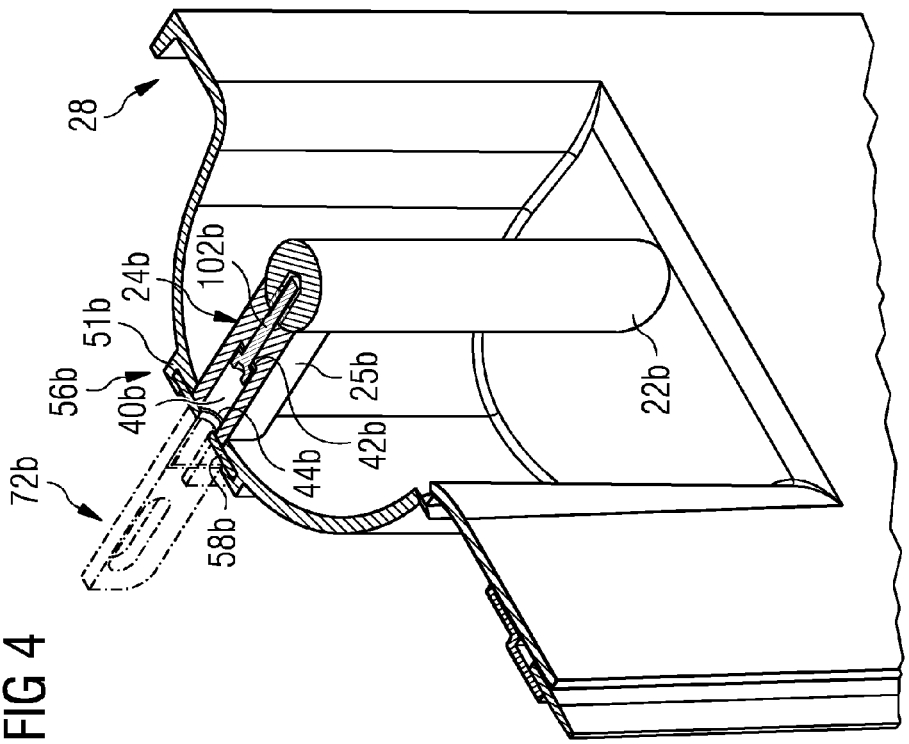

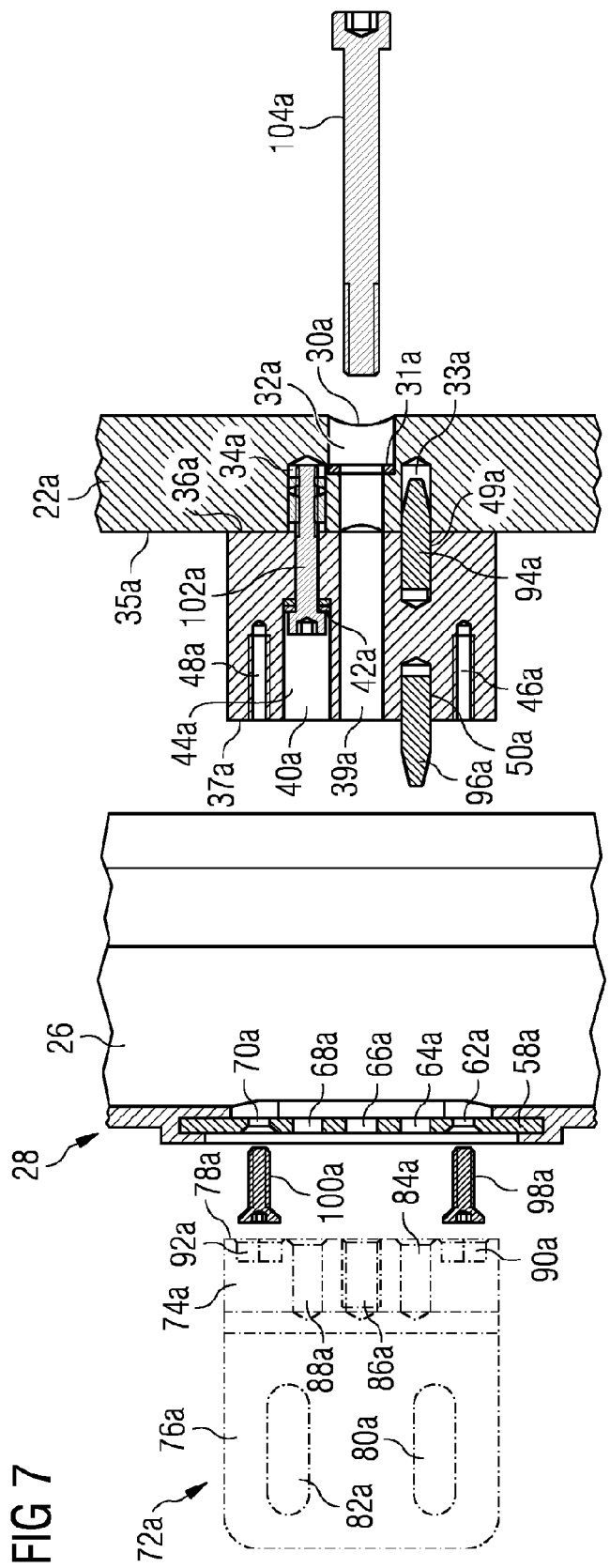

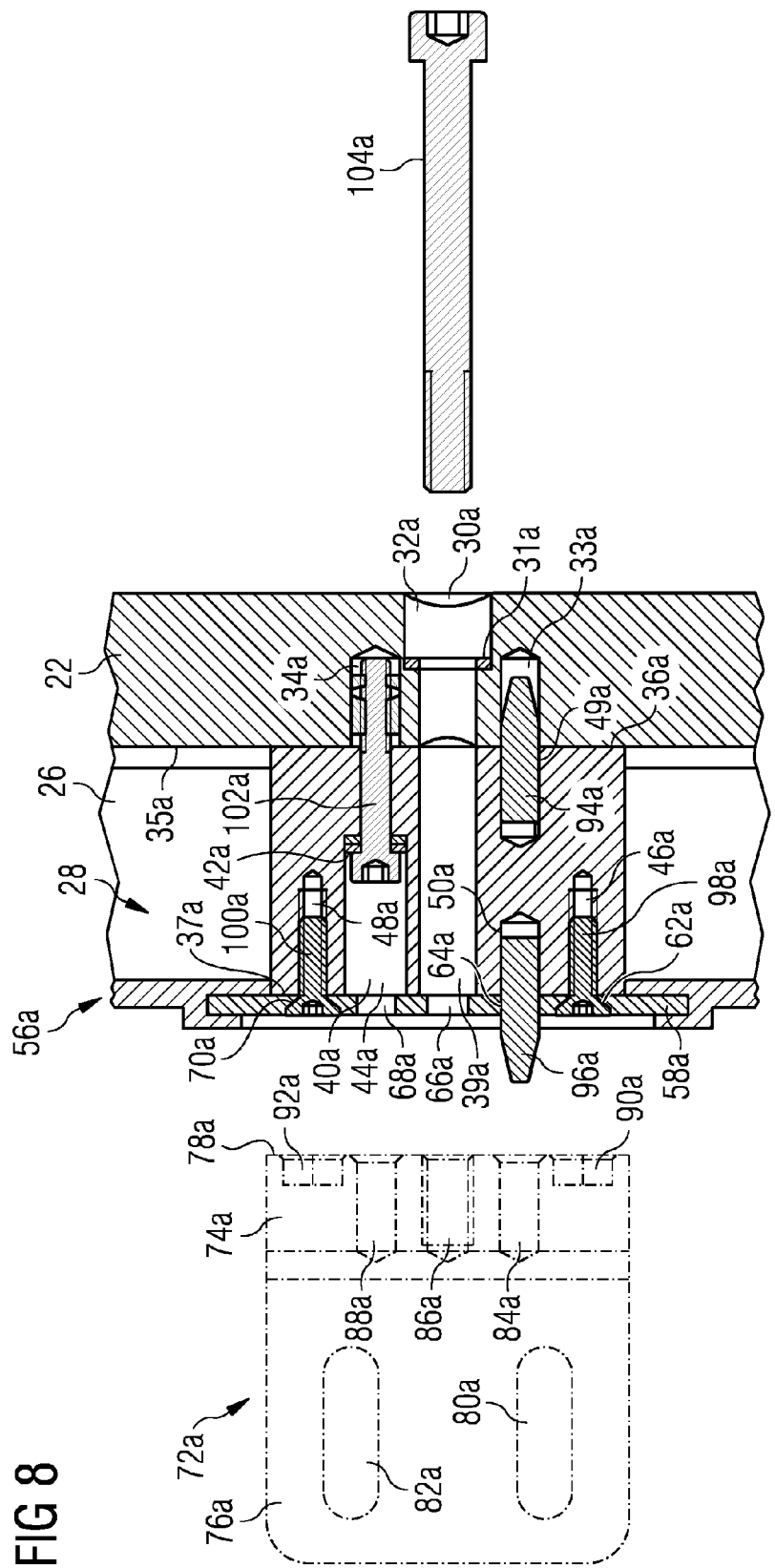

HOLDING ARRANGEMENT FOR AN ENTRY AREA OF A RAIL VEHICLE AND METHOD FOR ASSEMBLING THE HOLDING ARRANGEMENT

BACKGROUND OF THE INVENTION

Field of the Invention

The invention relates to a holding arrangement for an entry area of a rail vehicle and to a method for assembling a holding arrangement for an entry area of a rail vehicle.

It is known from practice that a holding arrangement is provided in the area of an entry door of the rail vehicle, said holding arrangement comprising a holding element which is connected to a door pillar paneling element. The door pillar paneling element is connected to a door pillar of the rail vehicle and the entry door is pivotally mounted on said door pillar. The holding arrangement makes it possible for passengers to be able to hold onto the holding element when getting out of the rail vehicle, getting into the rail vehicle or during the journey in the rail vehicle.

A one-part holding element of the holding arrangement can comprise a rod-shaped basic body and end portions of the holding element which are bent over perpendicularly to the basic body and are able to be connected to the door pillar paneling element. As an alternative to this, the one-part holding element can comprise the rod-shaped basic body and one or more spacer portions which can be arranged distributed along a longitudinal extension of the basic body, welded to the basic body and connected to the door pillar paneling element.

BRIEF SUMMARY OF THE INVENTION

It is the object of the invention to provide measures by way of which a holding arrangement for an entry area of a rail vehicle is able to be assembled in a simple and cost-efficient manner and is able to be connected to a door pillar of the rail vehicle.

A holding arrangement for an entry area of a rail vehicle is provided according to the invention, said holding arrangement having a rod-shaped holding element which comprises a through opening, a door pillar paneling element for covering a door pillar, wherein the door pillar paneling element comprises a through opening, a spacer element which is arranged between the holding element and the door pillar paneling element and comprises a through opening, a connecting element for connecting the door pillar paneling element to the door pillar, wherein the connecting element is arranged on a side of the door pillar paneling element remote from the spacer element and comprises a through opening, and a connecting screw which is screw-connected through the through opening of the holding element, the through opening of the spacer element and the through opening of the door pillar paneling element in the through opening of the connecting element.

The holding arrangement according to the invention is consequently based on the concept that, in place of a one-piece holding element, it is possible to provide a holding element and a separate spacer element which can make possible a two-piece holding possibility, which is at a spacing from the door pillar element, in the entry area of the rail vehicle for passengers of the rail vehicle. The holding element, the spacer element and the door pillar paneling element can be connected to a connecting element by means of a connecting screw by the connecting screw being able to extend through the through openings of the holding element, the spacer element and the door pillar paneling element. The connecting element can be directly connectable or indirectly connectable, i.e. by means of a further connecting element or further connecting elements, to the door pillar of a rail vehicle.

The modular method of construction of the holding arrangement can consequently make exchange of worn or damaged components of the holding arrangement possible such that maintenance costs for the holding arrangement can be particularly low. In addition, assembling or mounting the holding arrangement can be carried out in a particularly simple, time-saving and consequently cost-efficient manner as the holding element, the spacer element and the door pillar paneling element can be connected to the connecting element in one single operating step. In particular, the holding element, the spacer element and the door pillar paneling element, can be connected to the connecting screw as one module, for example outside the rail vehicle, and only then screw-connected to the connecting element. In this case, the connecting element can already be connected to the door pillar or can only be connected to the door pillar after this.

In particular, the holding element and/or the spacer element can be realized in a solid manner, that is of solid material. The holding element and/or the spacer element can comprise aluminum or can be realized from aluminum. In particular, the spacer element can be realized as a milling component or milling part, for example as an aluminum milling component.

The through opening of the holding element can taper in a step-shaped manner in the direction toward the spacer element, wherein a screw head of the connecting screw abuts against a portion of a boundary wall of the through opening, said portion extending transversely, in particular perpendicularly, to the longitudinal extension of the through opening. In particular, a corresponding abutment face in the holding element, which can be formed by the portion of the boundary wall of the through opening, can follow a shaping of the screw head. As a result, the connecting screw can be received completely in the holding element such that a risk of injury to a passenger when holding the holding element can be reduced. In addition, the holding arrangement can be realized in a particularly compact manner.

In particular, the through opening of the spacer element can extend transversely, in particular perpendicularly, and/or centrally through the spacer element, with reference to a longitudinal extension of the holding element. The first measure can make it easier to guide the connecting screw through the spacer element. The second measure can allow a particularly robust connection between the holding element and the connecting element as force introduction into the spacer element can be distributed equally during the assembling of the holding arrangement.

In particular, the through opening of the spacer element can comprise a constant diameter along its longitudinal extension.

The spacer element can comprise a further through opening which can taper in a step-shaped manner in the direction toward the holding element, wherein the spacer element can be screw-connected to the holding element by means of a further connecting screw, the screw head of which is able to abut against a portion of a boundary wall of the further through opening, said portion extending transversely, in particular perpendicularly, to the longitudinal extension of the further through opening of the spacer element. In this case, the shaping of the portion can follow the contour of the abutting screw head. Said measure can simplify the assembling of the holding arrangement as the holding element and the spacer element can already be connected by means of the connecting screw and cannot be screw-connected to the connecting element through the through opening of the door pillar paneling element until afterwards. In particular, the holding element can comprise a corresponding recess for this purpose. In addition, the screw head of the further connecting screw can be received in the spacer element such that an end face of the spacer element, which can point to the connecting element, can be realized in a flat manner and an accurately fitting and flush abutment of the spacer element against a corresponding adjacent component of the holding arrangement can be made possible.

The spacer element can comprise a recess which can be introduced into the spacer element from an end face that points to the holding element, wherein the holding element can comprise a recess which is arranged in alignment with the recess and can be introduced into the holding element from an end face that points to the spacer element, it being possible additionally for the holding arrangement to comprise a connecting pin which can be arranged, in particular in each case half in the recess of the spacer element and half in the recess of the holding element. In particular, a longitudinal extension of the recess of the spacer element and a longitudinal extension of the recess of the holding element can be slightly larger than a longitudinal extension of the connecting pin. As a result, the spacer element and the holding element can be secured against rotation and centered with respect to one another when the two elements are mounted such that the assembling of the holding arrangement and the connecting thereof to the door pillar is able to be simplified further. In particular, the connecting pin can be introduced initially into the recess of the spacer element and of the holding element before the further connecting screw can be introduced into the spacer element and screw-connected to the holding element. In particular, the holding element can comprise a corresponding further recess for this purpose.

In particular, the recess of the holding element and the further recess of the holding element can be arranged in each case adjacent the through opening of the holding element and/or can extend parallel to the through opening of the holding element.

In particular, the further through opening of the spacer element and the recess of the spacer element can be arranged in each case adjacent the through opening of the spacer element and/or can extend parallel to the through opening of the spacer element.

The spacer element can comprise a further recess which can be introduced into the spacer element from an end face that points to the connecting element, wherein the connecting element can comprise a further through opening, it being possible for the holding arrangement to comprise additionally a further connecting pin which is arranged, in particular in each case, half in the further recess of the spacer element and half in the further through opening of the connecting element. In particular, a longitudinal extension of the further recess of the spacer element can be slightly larger than half the longitudinal extension of the connecting pin. This can also make it possible for the spacer element and the connecting element to be secured against rotation and centered when the two components are assembled.

The recess of the spacer element and the further recess of the spacer element can be arranged in alignment with one another such that the use of space for the spacer element can be particularly good and the spacer element is able to be realized in a particularly small manner.

The spacer element can comprise at least one even further recess which can be introduced into the spacer end face of the spacer element that points to the connecting element, wherein the door pillar paneling element can comprise an angular projection at a spacing to a portion of an edge of its through opening, wherein a portion of the door pillar paneling element adjacent the portion of the edge of the through opening and the angular projection can form a pocket, it being possible for the holding arrangement to comprise additionally a plate shaped abutment element for the spacer element and the connecting element which is arranged in the pocket and can comprise a through opening, and one even further connecting screw which can be screw-connected through the through opening of the abutment element in the at least one even further recess of the spacer element. This can make a simple connection between the door pillar paneling element and the spacer element possible and reduces a possibility of damaging the door pillar paneling element when the spacer element and the holding element are mounted as the spacer element is not able to come into direct contact with the door pillar paneling element.

In particular, the through opening of the abutment element can be arranged in an edge region of the abutment element and the one even further recess of the spacer element can be arranged in an edge region of the spacer element such that the participating components are able to be connected together and at the same time central screw connection is possible by means of the connecting screw.

In particular, the spacer element can comprise a plurality of even further recesses, in particular precisely two even further recesses into which in each case one even further connecting screw can be screw-connected through a corresponding through opening of the abutment element. The even further recesses of the spacer element can be realized identically and/or in each case can extend parallel to one of the through openings of the spacer element and/or one of the recesses of the spacer element. In particular, the plurality of even further recesses of the spacer element, when viewed in the circumferential direction of the spacer element, can be distributed equally in an edge region of the spacer element and/or, when viewed along the longitudinal extension of the holding element, can be arranged in alignment with one another and/or in alignment with the through openings of the spacer element. The corresponding through openings of the abutment element, in this case, can be arranged in each case with one of the plurality of even further receiving means.

In particular, for each even further recess of the spacer element the connecting element can comprise a recess which can be arranged in alignment with the through opening of the abutment element and the recess of the spacer element such that a screw head of the even further connecting screw is able to be received in the connecting element and the connecting element and the abutment element are able to abut against one another in a flush manner. As a result, the holding arrangement can be realized in a particularly compact manner.

A body of the spacer element can be realized in a substantially cuboid manner, wherein a longitudinal extension of the body can extend substantially parallel to the longitudinal extension of the holding element. Said measure can make it possible to stabilize the holding element along its longitudinal extension and an installation space of the spacer element, when viewed along the longitudinal extension of the holding element, can be utilized in a particularly good manner as a corresponding end face of the spacer element can be realized in a sufficiently large manner in order to enable the arrangement of the recesses and the through openings of the spacer element.

An end face of the spacer element pointing to the holding element can abut against the holding element and be realized in a concave manner, and a further end face of the spacer element located opposite the end face can abut against the abutment element and be realized in a flat manner. This can make a particularly compact and sturdy method of construction of the holding arrangement possible.

In particular, at least one of the through openings of the holding element, the spacer element, the abutment element and/or the connecting element can also be realized as a through-bore and/or can comprise an internal thread. In particular, at least one of the recesses of the holding element, the spacer element and/or the connecting element can be realized as a bore, for example as a blind bore and/or can comprise an internal thread.

In particular, the holding arrangement can comprise a plurality of, in particular identically realized, portions of the holding element and portions of the door pillar paneling element, spacer elements, connecting elements and as an option abutment elements which are realized according to one or several of the above-described embodiments.

The invention additionally relates to a rail vehicle, having a holding arrangement which is described above. The rail vehicle can be, for example, a tram or a train, in particular a high speed train.

The invention additionally relates to a method for assembling a holding arrangement for an entry area of a rail vehicle, said holding arranged being described above and having the following steps—providing a rod-shaped holding element which comprises a through opening, providing a door pillar paneling element for covering a door pillar, wherein the door pillar paneling element comprises a through opening, providing a spacer element which comprises a through opening, providing a connecting element for connecting the door pillar paneling element to the door pillar, wherein the connecting element comprises a through opening, arranging the spacer element between the holding element and the door pillar paneling element, arranging the connecting element on a side of the door pillar paneling element that is remote from the spacer element and screw-connecting the holding element by means of a connecting screw through its through opening, through the through opening of the spacer element and through the through opening of the door pillar paneling element in the through opening of the connecting element.

The above-described characteristics, features and advantages of said invention as well as the manner in which they are achieved will become more clearly and more obviously comprehensible in conjunction with the following description of the exemplary embodiments which are explained in more detail in conjunction with the drawings. In this case, the features shown below can provide an aspect of the invention in each case both individually and also in combination. The drawings are as follows:

BRIEF DESCRIPTION OF THE SEVERAL VIEWS OF THE DRAWING

FIGS. 4, 5 show schematic perspective front views of the holding arrangement in FIG. 1 in part in section;

FIGS. 7, 8 show schematic side views of exploded representations of the holding arrangement in FIG. 1 in part in section.

DESCRIPTION OF THE INVENTION

Figure 1:
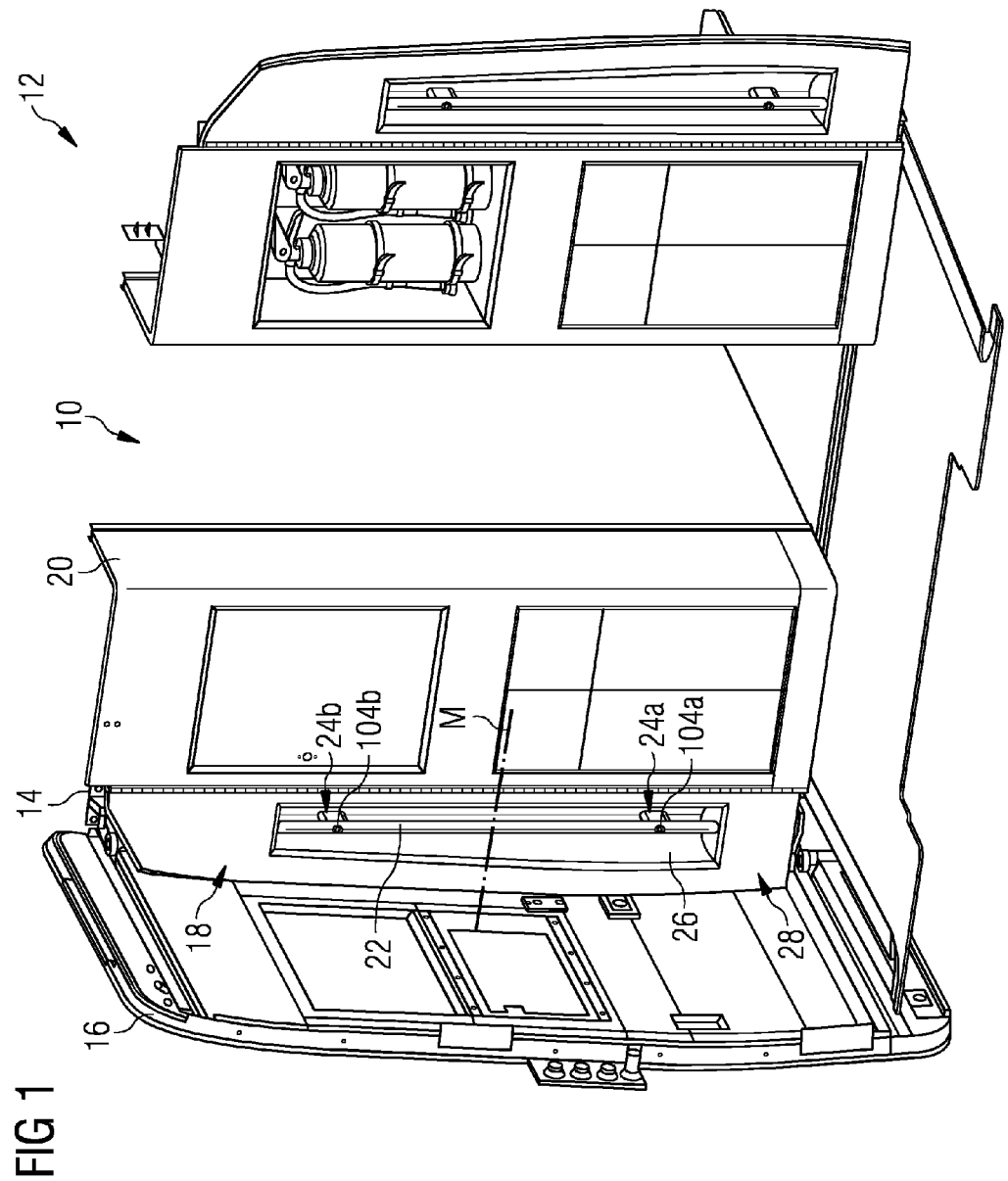
FIG. 1 shows a schematic view of an entry area of a rail vehicle having a holding arrangement according to one exemplary embodiment.
Figure 3:
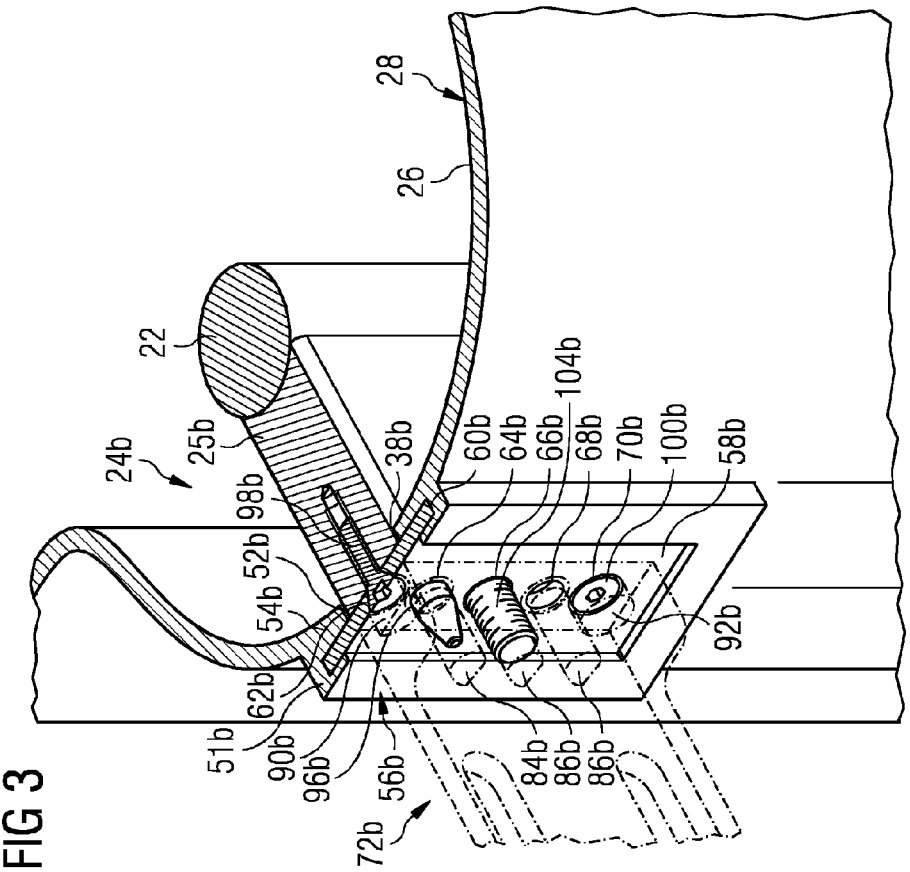
FIG. 3 shows a schematic perspective rear view of the holding arrangement in FIG. 1 in part in section.
Figure 2:
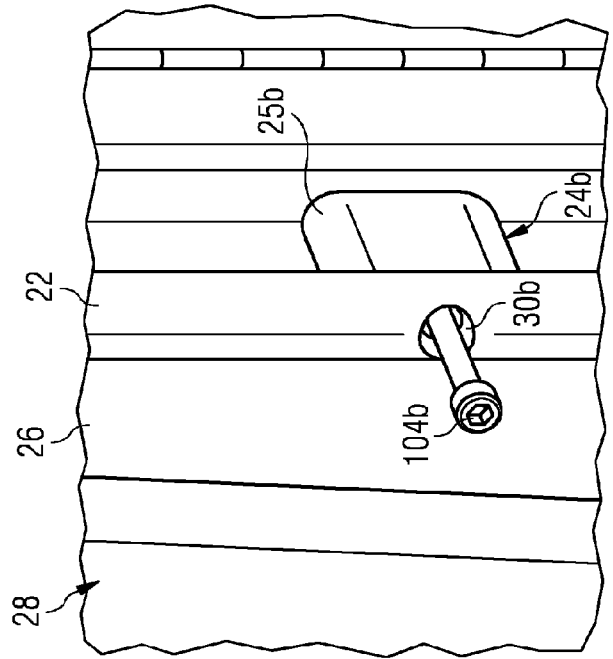
FIG. 2 shows a schematic perspective front view of the holding arrangement in FIG. 1.

An entry area 10 of a rail vehicle 12 comprises a door pillar 14 on which a door 16 of the rail vehicle 12 is pivotally mounted. A holding arrangement 18 for the entry area 10 of the rail vehicle 12 according to one exemplary embodiment is arranged in the entry area 10 of the rail vehicle 12 adjacent the door pillar 14 between the door 16 and a cupboard 20 of the rail vehicle 12. The holding arrangement 18 comprises a rod-shaped, solid holding element 22 which is arranged at a spacing from a curved bulge 26 of a door pillar paneling element 28 by means of two solid spacer elements 24a, 24b.

Figure 6:
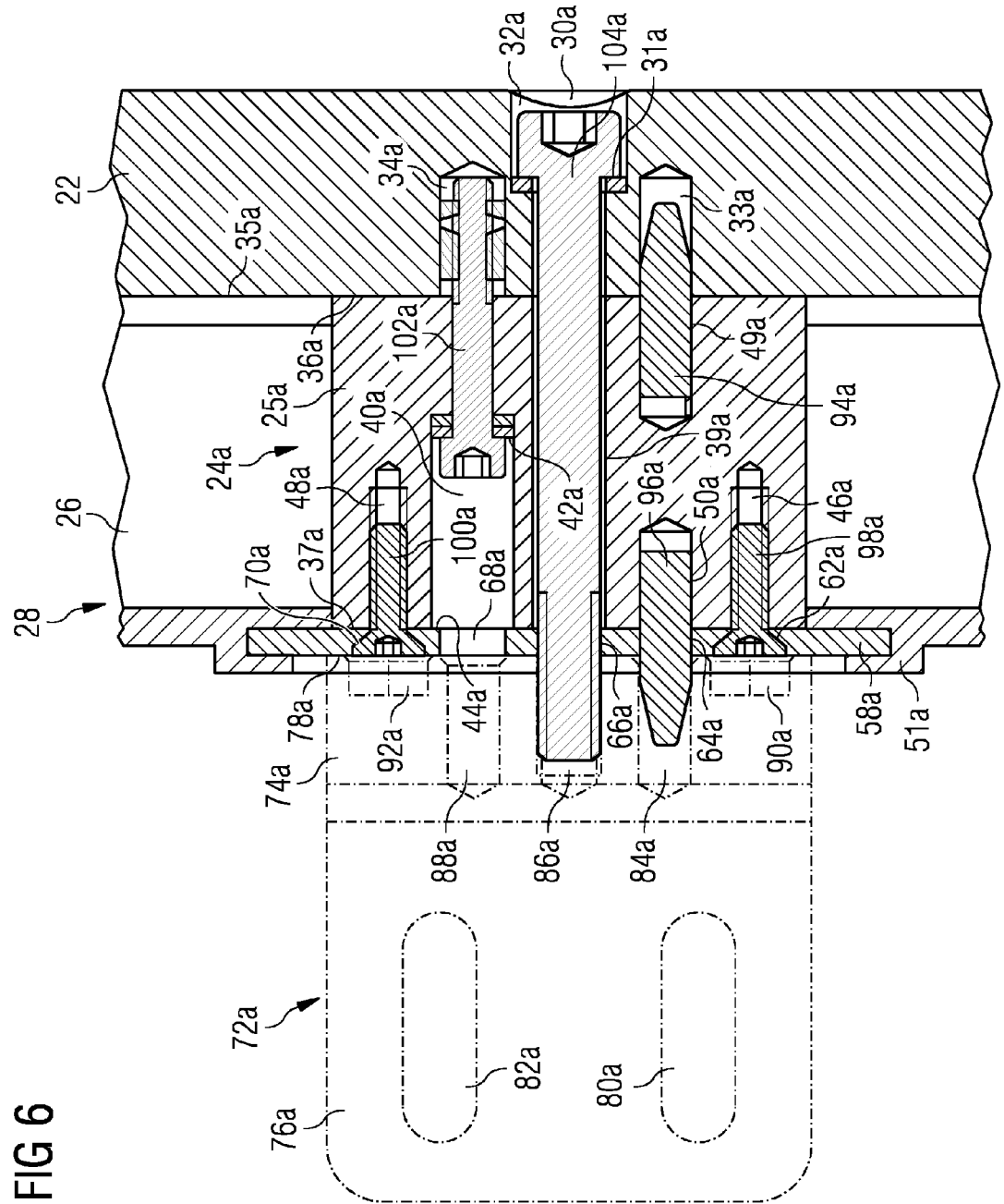
FIG. 6 shows a schematic side view of the holding arrangement in FIG. 1 in part in section.

The holding arrangement 18 is realized in an axially symmetrical manner with reference to a center plane M, which extends perpendicularly to a longitudinal extension of the holding element 22 and is shown by a dot dash line in FIG. 1, and comprises corresponding identically realized components which are arranged in a mirror-inverted manner in the region of each end portion of the holding element 22. FIGS. 2 to 5 show the holding arrangement 18 in the region of the spacer element 24b, and FIGS. 6 to 8 show the holding arrangement 18 in the region of the spacer element 24a.

Each end portion of the holding element 22 comprises a circular through opening 30a, b which tapers in a step-shaped manner in the direction toward the spacer element 24a, 24b along its longitudinal extension. A portion 31a, 31b of a boundary wall 32a, 32b of the through opening 30a, 30b is realized in a ring-shaped manner as an abutment surface for a screw head of a connecting screw and extends parallel to the longitudinal extension of the holding element 22 and perpendicular to a longitudinal extension of the through opening 30a, 30b. The holding element 22 additionally comprises a circular, first recess 33a, 33b and a circular second recess 34a, 34b which are introduced into a body of the holding element 22 in each case adjacent the through opening 30a, 30b from a cylindrical end face 35a, 35b of the holding element 22 which points to the spacer element 24a or 24b. The through opening 30a, 30b, the first recess 33a, 33b and the second recess 34a, 34b, when viewed along the longitudinal extension of the holding element 22, are arranged in alignment with one another and extend substantially parallel to one another. A longitudinal extension of the first and second recess 33a, 33b, 34a, 34b is approximately identical.

Each spacer element 24a, 24b comprises a substantially cuboid body 25a, 25b, the longitudinal extension of which extends parallel to the longitudinal extension of the holding element 22. A first end face 36a, b of the spacer element 24a, 24b is curved in a concave manner and abuts against the end face 35a, 35b of the holding element 22 in an accurately fitting manner. A second end face 37a, 37b of the spacer element 24a, 24b located opposite the first end face 36a, 36b is realized in a flat manner and is arranged in a rectangular through opening 38a, 38b of the door pillar paneling element 28.

A first through opening 39a, 39b of each spacer element 24a, 24b comprises a constant diameter which corresponds approximately to the diameter of the through opening 30a, b of the holding element 22. The spacer element 24a, 24b additionally comprises a second through opening 40a, 40b which tapers in a step-shaped manner in the direction of the holding element 22. A portion 42a, 42b of a boundary wall 44a, b of the second through opening 40a, 40b is realized in a ring-shaped manner as an abutment surface for a screw head of a further connecting screw and extends parallel to the longitudinal extension of the holding element 22 and perpendicular to a longitudinal extension of the through opening 40a, 40b. A diameter of a first portion of the through opening 40a, 40b, which is arranged adjacent the second end face 37a, 37b, corresponds approximately to a diameter of the through opening 30a, 30b of the holding element 22. A diameter of a second portion of the second through opening 40a, 40b, which is arranged adjacent the first end face 36a, 36b, is approximately half the diameter of the first portion of the second through opening 40a, 40b.

A first and second recess 46a, 46b, 48a, 48b of each spacer element 24a, 24b in the form of blind holes are introduced into the body 25a, b of the spacer element 24a, 24b from the end face 37a, 37b of the spacer element 24a, 24b. A diameter of the first and second recess 46a, 46b, 48a, 48b is approximately half the diameter of the first portion of the second through opening 40a, 40b. A longitudinal extension of the first and second recess 46a, 46b, 48a, 48b is slightly smaller than a longitudinal extension of the first portion of the second through opening 40a, 40b. A third recess 49a, 49b of each spacer element 24a, 24b extends proceeding from the first end face 36a, 36b into the body 25a, 25b of the spacer element 24a, 24b and extends approximately parallel to the first through opening 39a, 39b. A fourth recess 50a, 50b of each spacer element 24a, 24b extends proceeding from the end face 37a, 37b into the body 25a, 25b of the spacer element 24a, 24b and also extends substantially parallel to the first through opening 39a, 39b. The third and fourth recesses 49a, 49b, 50a, 50b, when viewed perpendicular to the longitudinal extension of the holding element 22, are arranged in alignment with one another and a longitudinal extension of the third and fourth recesses 49a, 49b, 50a, 50b, which are identical to one another, is slightly smaller than a longitudinal extension of the first and second recesses 46a, 46b, 48a, 48b. A diameter of the third and fourth recesses 49a, 49b, 50a, 50b is approximately two thirds of the diameter of the through opening 39a, 39b of the spacer element 24a, 24b. The fourth recess 50a, b, when viewed along the longitudinal extension of the holding element 22, is arranged between the first recess 46a, 46b and the first through opening 39a, 39b and in alignment with the first and second recesses 46a, 46b, 48a, 48b and the first through opening 39a, b and the first portion of the second through opening 40a, b, whilst the third recess 49a, 49b, when viewed along the longitudinal extension of the holding element 22, is arranged in alignment with the second portion of the second through opening 40a, 40b.

The door pillar paneling element 28 comprises an angular projection 51a, 51b which is arranged at a spacing from a bottom portion and two side portions of an edge 52a, 52b of the through opening 38a, 38b of the door pillar paneling element 28. The angular projection 51a, 51b comprises two portions which extend perpendicularly to one another such that a portion 54a, 54b of the door pillar paneling element 28, which is arranged adjacent the bottom portion and the side portions of the edge 52a, 52b, and the angular projection 51a, 51b form a pocket 56a, 56b which is open in the direction toward the holding element 22 and the door pillar 14.

A plate-shaped abutment element 58a, 58b of the holding arrangement 18 is received in a groove-shaped opening 60a, 60b of each pocket 56a, 56b. The abutment element 58a, 58b comprises a first to fifth through opening 62a, 62b-70a, 70b which are realized in a circular manner and, when viewed along the longitudinal extension of the holding element 22, are arranged in alignment with one another and extend substantially parallel to one another.

The second to fourth through openings 64a, 64b, 66a, 66b, 68a, 68b comprise a constant diameter along their longitudinal extension, whilst the first and fifth through openings 62a, 62b, 70a, 70b, which are realized identically to one another, taper uniformly in the direction of the holding element 22.

Each connecting element 72a, 72b of the holding arrangement 18 comprises an L-shaped body with a first portion 74a, 74b and a second portion 76a, 76b which extend approximately perpendicular to one another. The first portion 74a, 74b of the connecting element 70a, 70b comprises an end face 78a, 78b which is realized in a flat manner. The second portion 76a, 76b comprises elongated through openings 80a, 80b, 82a, 82b, through which the corresponding connecting screws are screw-connected to a further connecting element which is connected, in turn, directly or indirectly to the door pillar 14. A thickness of the first portion 74a, 74b, which is measured in the direction of the abutment element 58a, 58b, is three times as large as a thickness of the second portion 76a, 76b of the connecting element 72a, 72b which is measured in a direction perpendicular to the longitudinal extension of the holding element 22 and perpendicular to the thickness direction of the first portion 74a, 74b of the connecting element 72a, 72b.

A first to third through opening 84a, 84b-88a, 88b of the first portion 74a, 74b of the connecting element 72a, 72b, which are circular in each case, are arranged in alignment with the second to fourth through openings 64a, 64b-68a, 68b of the abutment element 58a, 58b and comprise in each case a diameter which corresponds approximately to the diameter of the corresponding through opening 64a, 64b-68a, 68b of the abutment element 58a, 58b and the corresponding recess 50a, 50b, 39a, 39b, 40a, 40b of the spacer element 24a, 24b. A first and second recess 90a, 90b, 92a, 92b of the connecting element 72a, 72b, proceeding from the end face 78a, 78b of the first portion 74a, 74b of the connecting element 72a, 72b, are introduced into the first portion 74a, 74b of the connecting element 72a, 72b. A diameter of the first and second recess 90a, 90b, 92a, 92b is slightly larger than a largest diameter of the through openings 62a, 62b, 70a, 70b of the abutment element 58a, 58b.

In a mounted state of the holding arrangement 18, the spacer element 24a, 24b is arranged between the holding element 22 and the abutment element 58a, 58b and the first end face 36a, 36b of the spacer element 24a, 24b and the end face 35a, 35b of the holding element 22 and the second end face 37a, 37b of the spacer element 24a, 24b and the end face of the abutment element 58a, 58b abut against one another in an accurately fitting manner. The end face 78a, 78b of the connecting element 72a, 72b abuts against a further end face of the abutment element 58a, 58b in an accurately fitting manner.

A first connecting pin 94a, 94b is received in the first recess 33a, 33b of the holding element 22 and the third recess 49a, 49b of the spacer element 24a, 24b. A second connecting pin 96a, 96b is received in the fourth recess 50a, 50b of the spacer element 24a, 24b and through the through opening 64a, 64b of the abutment element 58a, 58b in the first through opening 84a, 84b of the connecting element 72, 72b. A tapering tip of the first or second connecting pin 94a, 94b, 96a, 96b points to the holding element 22 or the door pillar 14. A connecting screw 98a, 98b is screwed through the first through opening 62a, 62b of the abutment element 58a, 58b in the first recess 46a, 46b of the spacer element 24a, 24b. A further connecting screw 100a, 100b is screwed through the fifth through opening 70a, 70b of the abutment element 58a, 58b in the second recess 48a, 48b of the spacer element 24a, 24b.

A connecting screw 102a, 102b is screwed in the recess 40a, 40b of the spacer element 24a, 24b and the recess 34a, 34b of the holding element 22 in such a manner that the screw head of the connecting screw 102a, 102b abuts against the ring-shaped portion 42a, 42b of the boundary wall 44a, 44b of the second through opening 40a, 40b. A further connecting screw 104a, 104b is screwed in the through opening 30a, 30b of the holding element 22, the through opening 39a, 39b of the spacer element 24a, 24b and the through opening 86a, 86b of the connecting element 72a, 72b and extends through the through opening 66a, 66b of the abutment element 58a, 58b. In this case, a screw head of the connecting screw 104a, 104b abuts against the ring-shaped portion 31a, 31b of the boundary wall 32a, 32b of the through opening 30a, 30b.

In the case of a method for assembling the holding arrangement 18, each spacer element 24a, 24b is initially centered on the holding element 22 by means of the first connecting pin 94a, 94b. The connecting screw 102a, 102b is then screwed in the through opening 40a, 40b of the spacer element 24a, 24b and the recess 34a, 34b of the holding element 22. Next, the spacer element 24a, 24b is positioned adjacent the tab 56a, 56b of the door pillar paneling element 28 in which the abutment element 58a, 58b is inserted. The connecting screws 98a, 98b, 100a, 100b are screwed through the first or fifth through opening 62a, 62b, 70a, 70b of the abutment element 60a, 60b in the first or second recess 46a, 46b or 48a, 48b. The second connecting pin 96a, 96b is pushed in the fourth recess 50a, 50b of the spacer element 24a, 24b through the through opening 66a, 66b of the abutment element 60a, 60b and the connecting element 72a, 72b is arranged in such a manner on the abutment element 58a, 58b that the second connecting pin 96a, 96b is arranged in the recess 84a, 84b of the connecting element 72a, 72b.

The connecting element 72a, 72b is then screwed by means of the connecting screw 104a, 104b to the pre-mounted module consisting of the holding element 22, the spacer element 24a, 24b, the door pillar paneling element 28 and the abutment element 58a, 58b. The connecting element 72a, 72b is then screwed by means of corresponding connecting screws, which extend through the through openings 80, 82, to the further connecting element which is then fastened directly or indirectly to the door pillar 14.

Although the invention is illustrated and described in more detail by the preferred exemplary embodiment, the invention is not restricted by the disclosed examples and other variations can be derived therefrom by the expert without departing from the scope of protection of the invention.

The invention claimed is:

1. A mounting arrangement for an entry area of a rail vehicle, the mounting arrangement comprising:
    a rod-shaped holding element having a through opening formed therein;
    a door pillar paneling element for covering a door pillar, said door pillar paneling element having a through opening formed therein;
    a spacer element disposed between said holding element and said door pillar paneling element and having a through opening formed therein;
    a connecting element for connecting said door pillar paneling element to said door pillar, said connecting element being arranged on a side of said door pillar paneling element remote from said spacer element and having an opening formed therein; and
    a connecting screw extending through said through opening of said holding element, said through opening of said spacer element, and said through opening of said door pillar paneling element and being screw-connected at said opening of said connecting element.

2. The mounting arrangement according to claim 1, wherein said through opening of said holding element narrows with a step in a direction toward said spacer element, wherein a screw head of said connecting screw abuts against a portion of a boundary wall of said through opening of said holding element, said portion extending transversely to the longitudinal extension of said through opening of said holding element.

3. The mounting arrangement according to claim 2, wherein said portion of said boundary wall extends perpendicularly to said through opening.

4. The mounting arrangement according to claim 1, wherein said spacer element is formed with a further through opening which tapers with a step in a direction toward said holding element, wherein said spacer element is screw-connected to said holding element by way of a further connecting screw having a screw head abutting against a portion of a boundary wall of said further through opening, said portion extending transversely to a longitudinal extension of said further through opening of said spacer element.

5. The mounting arrangement according to claim 4, wherein said portion of said boundary wall of said further through opening extends perpendicularly to said further through opening.

6. The mounting arrangement according to claim 1, wherein:
    said spacer element is formed with a recess introduced into said spacer element from an end face that points to said holding element;
    said holding element is formed with a recess in alignment with said recess in said holding element from an end face of said holding element that points to said spacer element; and
    a connecting pin is disposed in said recess of said spacer element and in said recess of said holding element.

7. The mounting arrangement according to claim 6, wherein:
    said spacer element is formed with a further recess introduced into said spacer element from an end face that points to said connecting element;
    said connecting element is formed with a further opening; and
    a further connecting pin is disposed in said further recess of said spacer element and in said further opening of said connecting element.

8. The mounting arrangement according to claim 7, wherein one half of said connecting pin is disposed in said recess of said spacer element and one half is disposed in said recess of said holding element, and wherein one half of said further connecting pin is disposed in said further recess of said spacer element and one half is disposed in said further opening of said connecting element.

9. The mounting arrangement according to claim 7, wherein said recess in said spacer element and said further recess in said spacer element are arranged in alignment with one another.

10. The mounting arrangement according to claim 7, wherein:
    said spacer element is formed with at least one other recess introduced into said spacer element from an end face that points to said connecting element;
    said door pillar paneling element is formed with an angular projection adjacent an edge of said through opening formed therein, wherein a portion of an edge of said door pillar paneling element adjacent said portion of said edge of said through opening and said angular projection form a pocket; and further comprising:

a plate shaped abutment element for said spacer element and said connecting element, said abutment element being arranged in said pocket and having a through opening formed therein; and at least one other connecting screw that is screw-connected through said through opening in said abutment element in said at least one other recess of said spacer element.

11. The mounting arrangement according to claim 1, wherein said spacer element is a substantially cuboid body, and a longitudinal extension of said cuboid body extends substantially parallel to a longitudinal extension of said holding element.

12. The mounting arrangement according to claim 11, wherein said spacer element has a first, concave end face abutting against said holding element and a second, flat end face opposite said first end face and abutting against said abutment element.

13. A method for assembling a mounting arrangement for an entry area of a rail vehicle, the method comprising:

providing a rod-shaped holding element with a through opening;

providing a door pillar paneling element for covering a door pillar, the door pillar paneling element having a though opening;

providing a spacer element with a through opening; and providing a connecting element for connecting the door pillar paneling element to the door pillar, the connecting element having a through opening;

arranging the spacer element between the holding element and the door pillar paneling element;

arranging the connecting element on a side of the door pillar paneling element that is remote from the spacer element; and screw connecting the holding element by way of a connecting screw extending through its through opening, through the through opening of the spacer element and through the through opening of the door pillar paneling element in the through opening of the connecting element;

to thereby form a mounting arrangement according to claim 1.

* * * * *